(12) United States Patent
Chand et al.

(10) Patent No.: US 7,885,942 B2
(45) Date of Patent: Feb. 8, 2011

(54) TRAFFIC PRODUCTION INDEX AND RELATED METRICS FOR ANALYSIS OF A NETWORK OF RELATED WEB SITES

(75) Inventors: Jagdish Chand, Fremont, CA (US); Joshua Klahr, East Palo Alto, CA (US)

(73) Assignee: Yahoo! Inc., Sunnyvale, CA (US)

( * ) Notice: Subject to any disclaimer, the term of this patent is extended or adjusted under 35 U.S.C. 154(b) by 286 days.

(21) Appl. No.: 11/689,343

(22) Filed: Mar. 21, 2007

(65) Prior Publication Data

US 2008/0235622 A1  Sep. 25, 2008

(51) Int. Cl.
*G06F 7/00* (2006.01)
*G06F 17/00* (2006.01)

(52) U.S. Cl. .................... 707/688; 707/694; 707/696

(58) Field of Classification Search .............. 709/203; 707/102
See application file for complete search history.

(56) References Cited

U.S. PATENT DOCUMENTS

| | | | | |
|---|---|---|---|---|
| 7,146,416 B1 * | 12/2006 | Yoo et al. | ............ | 707/E17.119 |
| 2002/0143925 A1 * | 10/2002 | Pricer et al. | .................. | 709/224 |
| 2003/0128231 A1 * | 7/2003 | Kasriel et al. | ............... | 345/736 |
| 2003/0128233 A1 * | 7/2003 | Kasriel | ........................ | 345/738 |
| 2003/0131097 A1 * | 7/2003 | Kasriel et al. | ............... | 709/224 |
| 2003/0154237 A1 * | 8/2003 | Mah et al. | .................. | 709/201 |
| 2004/0133671 A1 * | 7/2004 | Taniguchi | ................... | 709/224 |
| 2005/0125195 A1 * | 6/2005 | Brendel | ...................... | 702/182 |
| 2005/0235030 A1 * | 10/2005 | Lauckhart et al. | ........... | 709/200 |
| 2006/0149728 A1 * | 7/2006 | Error et al. | ..................... | 707/5 |
| 2007/0271218 A1 * | 11/2007 | Lim et al. | ...................... | 707/2 |

OTHER PUBLICATIONS

Haigh et al., "Measuring Web Site Usage: Log File Analysis", Information Technology Services, National Library of Canada, Aug. 4, 1998.

* cited by examiner

*Primary Examiner*—Mohammad Ali
*Assistant Examiner*—Kannan Shanmugasundaram
(74) *Attorney, Agent, or Firm*—Weaver Austin Villeneuve and Sampson LLP

(57) ABSTRACT

A solution is provided for determining traffic patterns involving a web page or property of interest in a computer network. This includes receiving path data regarding the web page or property of interest. Then, the number of visits to each of the other pages or properties visited by users in a session that included a visit to the web page or property of interest is counted. Then, from the path data and the counts, an aggregated data structure is constructed including, for each of the other web pages or properties visited by users in a session that included a visit to the web page or property of interest, visit count information and information regarding which web page or property within the network users visited next, if any. Then one or more metrics directed to traffic surrounding the web page or property of interest is provided using information from the aggregated data structure.

19 Claims, 5 Drawing Sheets

TRAFFIC PRODUCTION INDEX AND RELATED METRICS FOR ANALYSIS OF A NETWORK OF RELATED WEB SITES

BACKGROUND OF THE INVENTION

1. Field of the Invention

The present invention relates to network path data. More particularly, the present invention relates to analysis of traffic patterns from network path data.

2. Description of the Related Art

The process of analyzing Internet-based actions such as web surfing patterns is known as web analytics. One part of web analytics is understanding how user traffic flows through a network (also known as user paths). This typically involves analyzing which nodes a user encounters when accessing a particular network. Standard web analytic tools may be fine for basic networks. However, for large network, such as, for example, large search engine/directories, traditional web analytic tools fail to provide enough information for administrators to properly judge network, and specifically web page, performance.

What is needed is a solution that improves an administrator's ability to effectively judge web analytics.

SUMMARY OF THE INVENTION

A solution is provided for determining traffic patterns involving a web page or property of interest in a computer network. This includes receiving path data regarding the web page or property of interest. Then, the number of visits to each of the other pages or properties visited by users in a session that included a visit to the web page or property of interest is counted. Then, from the path data and the counts, an aggregated data structure is constructed including, for each of the other web pages or properties visited by users in a session that included a visit to the web page or property of interest, visit count information and information regarding which web page or property within the network users visited next, if any. Then one or more metrics directed to traffic surrounding the web page or property of interest is provided using information from the aggregated data structure.

DETAILED DESCRIPTION OF SPECIFIC EMBODIMENTS

Figure 1:
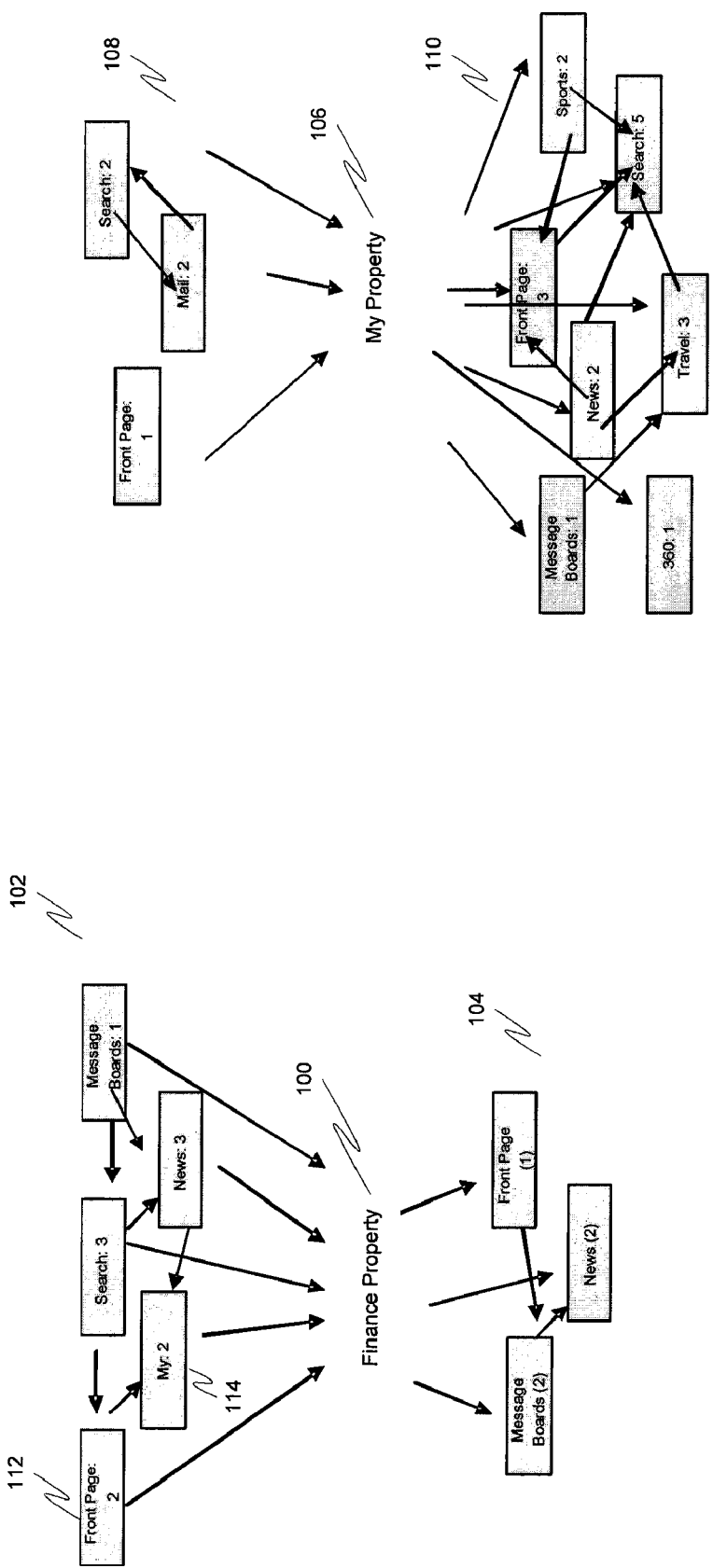
FIG. 1 is a diagram illustrating an example of two hypothetical traffic production and consumption diagrams.

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

The properties and products of a large search engine or network can be used to create products and experiences that result in more engaged users. One measure of user engagement is the ability of any given network property (or page) to generate subsequent activity within the network. For purposes of this document, the term "property" refers to a grouping of web pages. For example, a property might be "Finance," which may include numerous web pages relating to finance (stock quote page, stock information page, general financial news page, etc.). Thus, it may be beneficial, for example, to know when users of a Finance property then proceed to pages within a Sports property. In other words, network marketers and general managers would benefit from having the ability to understand the extent to which their properties stimulate subsequent engaged user behavior within the network. Additionally, within a specific property, product managers would benefit from the ability to know which pages within the property drive additional activity and which do not.

In an embodiment of the present invention, a traffic index is provided along with related reporting. This may be provided by a core processing engine known as "Source-to-Destination" (SDS). This engine analyzes a set of nodes within a network (a node could be a property or page) and provides session-based quantification of all "destination" nodes viewed by visitors who viewed a particular "source" node.

For illustration, a user may navigate through the following pages in a single "session of web activity:

P1>P2>P3>P2>P4>P5>P2>P3>P6>P2

Using the Source-to-Destination processing engine, a request can be made to provide the destination results where Source=P1. This will, in essence, provide a page-by-page count of all visits that were destinations of a user who's browsing behavior started on P1. The resulting destination data would be as follows [P2=4, P3=2, P4=1, P5=1, P6=1]. Reverse analysis may also be supported, that is, determining the source nodes for a particular destination. For example, the source results for destination=P3 are [P2=3, P1=1, P4=1, P5=1].

The core capabilities of the SDS engine then permit the construction (at the property or page level) of an aggregated source and destination tree for any node. FIG. 1 is a diagram illustrating an example of two hypothetical traffic production and consumption diagrams. Property 100 consumes traffic from nodes 102 and produces traffic to nodes 104. Property 106 consumes traffic from nodes 108 and produces traffic to nodes 110. The values within the nodes represent the number of visits to the node. From this diagram, one can see, for example, that a user navigated from Front page 112 to the Finance property 100 directly, while another navigated from Front page 112 to My 114, 106 to the Finance property 100. These examples seem to indicate that the Finance property 100 is a net traffic consumer, while My 100, 106 is a net traffic producer.

Given the ability to construct this tree of sources and destinations for any node, it is possible to then arrive at a set of derived metrics that help to understand any given node's performance as either a producer or consumer of traffic.

Various metrics may be constructed. These include, but are not limited to:

Visits (i.e., visits to the node)
Page Views (i.e., visits to a particular page within the node)
Page Views/Visits
Upstream Properties Consumed (i.e., number of nodes that fed traffic)
Upstream Visits Consumed (i.e., number of overall visits from other network properties)
Consumption ratio (i.e., visits consumed/properties consumed)
Downstream Properties Produced (i.e., number of nodes that were visited after visiting the indicated property)
Downstream Visits Produced (i.e., number of overall visits to other network properties after visiting the indicated property).
Production ratio (i.e., visits produced/properties produced)
Property Production Index (i.e., downstream properties produced/upstream properties consumed)
Visit Production Index (i.e., downstream visits produced/upstream visits consumed)

For the examples provided in FIG. 1, the following metrics may be constructed:

Finance Metrics:
Visits, Page View, Page Views/Visits
Upstream Properties Consumed (5)
Upstream Visits Consumed (11)
Consumption Ratio (11/5)
Downstream Properties Produced (3)
Downstream Visits Produced (5)
Production Ratio (5/3)
Property Production Index (3/5)
Visit Production Index (5/11)
My Metrics:
Visits, Page View, Page Views/Visits
Upstream Properties Consumed (3)
Upstream Visits Consumed (5)
Consumption Ratio (5/3)
Downstream Properties Produced (7)
Downstream Visits Produced (17)
Production Ratio (17/7)
Property Production Index (7/3)
Visit Production Index (17/5)

Even without the benefit of visualization, it can easily be seen that the visit production index (0.454 in the case of Finance and 3.4 in the case of My) is an excellent indicator of each node's value as a traffic producer). Other metrics, such as downstream properties produced, help measure the diversity (or lack thereof) of the traffic any given node may generate.

Figure 2:
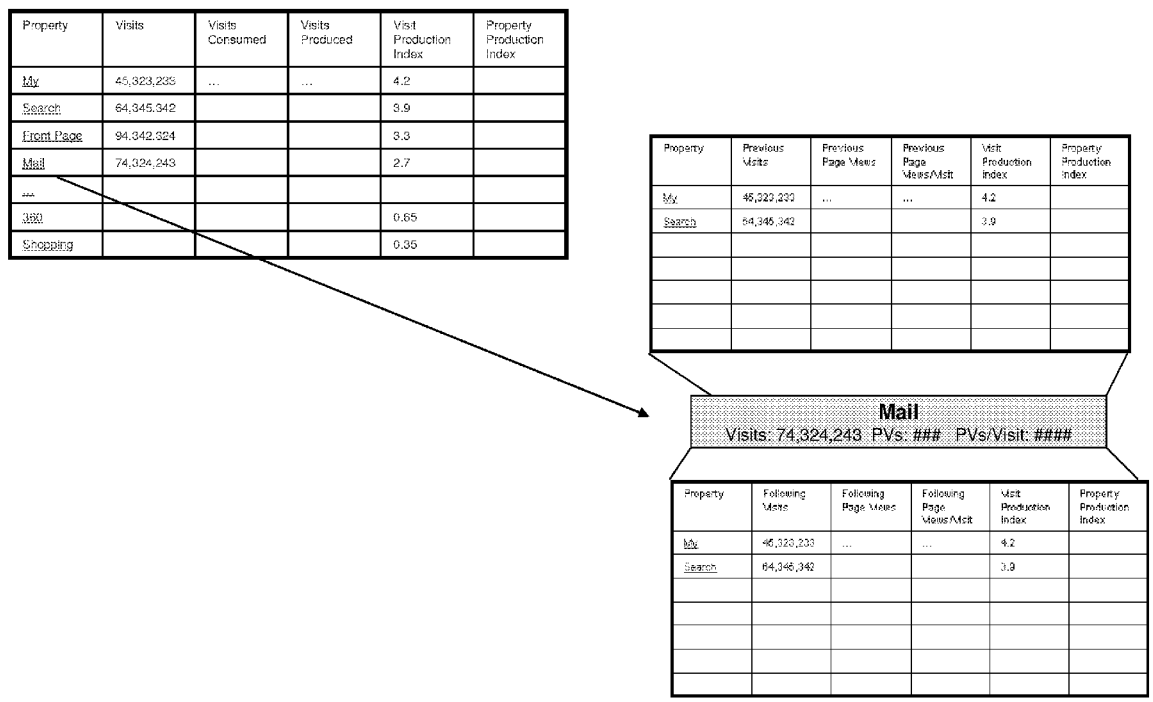
FIG. 2 is a diagram illustrating a sample report in accordance with one embodiment of the present invention.

These metrics may then be included as part of a production reporting system to allow network users and administrators understand the top performing and bottom performing properties when it comes to producing additional, engaged network traffic. FIG. 2 is a diagram illustrating a sample report in accordance with one embodiment of the present invention. Report 200 shows the top properties in the network ranked by their visit production index. For example, Mail shows a visit production index of 2.7. Users or administrators may select a given property from this report to understand better the property. For example, clicking on mail in report 200 may generated report 202, which tells more about from what properties Mail is "consuming" traffic (in this case, a large percentage comes from My) and to what properties mail is "producing" traffic (in this case, a large percentage goes to Search).

Figure 3:
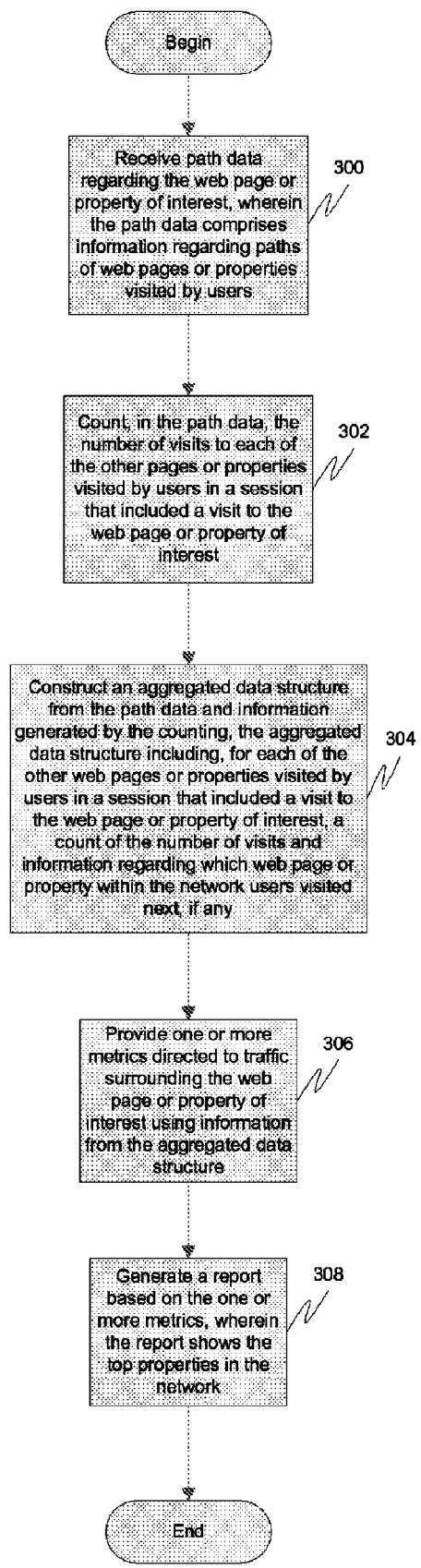
FIG. 3 is a flow diagram illustrating a method for determining traffic patterns involving a web page or property of interest in a computer network in accordance with an embodiment of the present invention.

FIG. 3 is a flow diagram illustrating a method for determining traffic patterns involving a web page or property of interest in a computer network in accordance with an embodiment of the present invention. At 300, path data regarding the web page or property of interest is received, wherein the path data comprises information regarding paths of web pages or properties visited by users. At 302, the number of visits to each of the other pages or properties visited by users in a session that included a visit to the web page or property of interest is counted in the path data.

At 304, an aggregated data structure is constructed from the path data and information generated by the counting, the aggregated data structure including, for each of the other web pages or properties visited by users in a session that included a visit to the web page or property of interest, a count of the number of visits and information regarding which web page or property within the network users visited next, if any. This aggregated data structure may include, for example, an aggregated source and destination tree. At 306, one or more metrics directed to traffic surrounding the web page or property of interest is provided using information from the aggregated data structure. These metrics may include any or all of the metrics described above. At 308, a report may be generated based on the one or more metrics, wherein the report shows the top properties in the network. This report may be sorted based on, for example, rank of each property.

Figure 4:
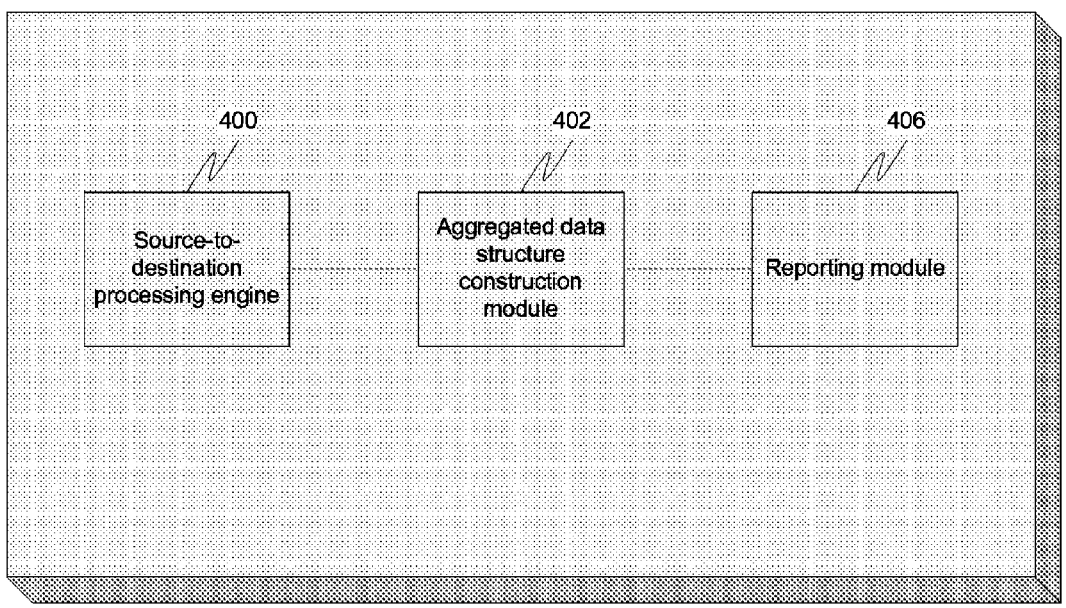
FIG. 4 is a block diagram illustrating an apparatus for determining traffic patterns involving a web page or property of interest in a computer network in accordance with an embodiment of the present invention.

FIG. 4 is a block diagram illustrating an apparatus for determining traffic patterns involving a web page or property of interest in a computer network in accordance with an embodiment of the present invention. A source-to destination processing engine 400 may perform the processes described in 300 and 302 of FIG. 3 and the accompanying text above. An aggregated data structure construction module 402 coupled to the source-to destination processing engine 400 may perform the process described in 304 of FIG. 3 and the accompanying text above. A reporting module 404 coupled to the aggregated data structure construction module 402 may perform the processes described in 306 and 308 of FIG. 3 and the accompanying text. It should be noted that these various modules and engines may either be distinct components of the apparatus or many be combined in various permutations to operate in as few as one component. As such, the description of these modules as having distinct names should not be read to in any way imply that the modules are physically distinct.

Figure 5:
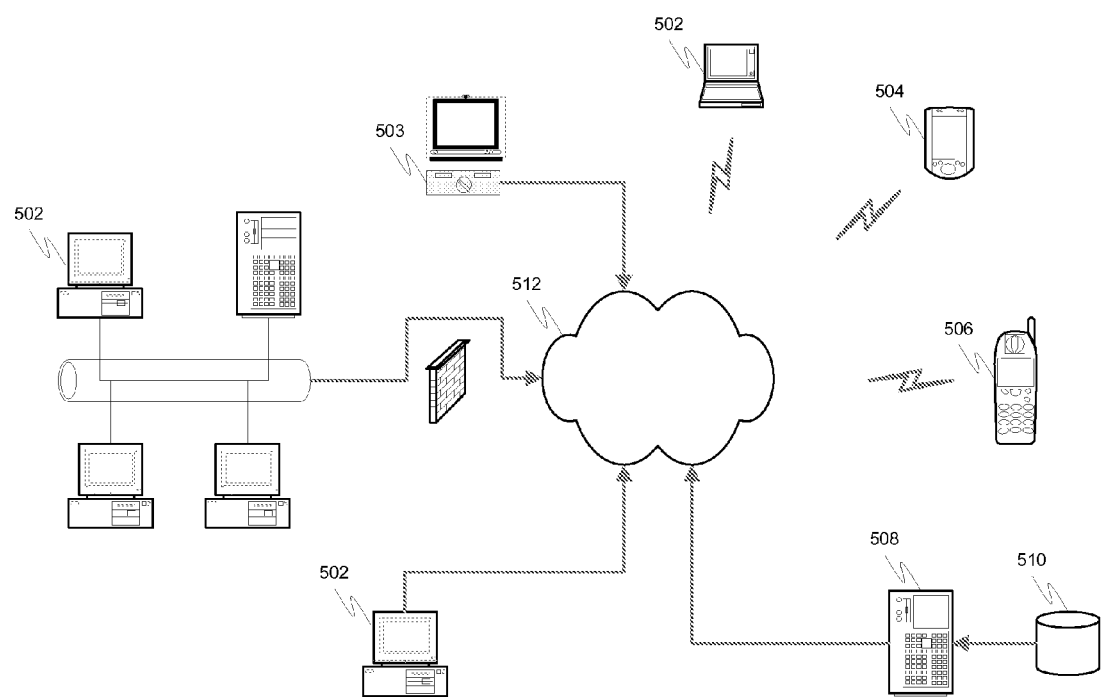
FIG. 5 is an exemplary network diagram illustrating some of the platforms that may be employed with various embodiments of the invention.

It should also be noted that the present invention may be implemented on any computing platform and in any network topology in which analysis of path information is a useful functionality. For example and as illustrated in FIG. 5, implementations are contemplated in which the path information is collected in a network containing personal computers 502, media computing platforms 503 (e.g., cable and satellite set top boxes with navigation and recording capabilities (e.g., Tivo)), handheld computing devices (e.g., PDAs) 504, cell phones 506, or any other type of portable communication platform. Users of these devices may navigate the network, and path information may be collected by server 508. Server 508 may then utilize the various techniques described above to store and analyze path information in an efficient manner. Applications may be resident on such devices, e.g., as part of a browser or other application, or be served up from a remote site, e.g., in a Web page, (represented by server 508 and data store 510). The invention may also be practiced in a wide variety of network environments (represented by network 512), e.g., TCP/IP-based networks, telecommunications networks, wireless networks, etc.

While the invention has been particularly shown and described with reference to specific embodiments thereof, it will be understood by those skilled in the art that changes in the form and details of the disclosed embodiments may be made without departing from the spirit or scope of the invention. In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A computer-implemented method for determining traffic patterns involving a web property of interest in a computer network, the method implemented by at least one computing device carrying out the steps comprising:
    receiving path data regarding the web property of interest, wherein the path data comprises information regarding user sessions in the computer network, each user session including a plurality of web properties visited by a corresponding user, each web property comprising one or more web pages, and being characterized by a distinct subject matter or service;
    for a particular web property of interest, identifying based on the path data all other web properties visited in any session that included a visit to the web property of interest;
    for each of the other web properties, generating count information by counting a number of visits by any user to each such other web property in the sessions that included a visit to the web property of interest;
    constructing, from the path data and the count information, an aggregated data structure corresponding to the web property of interest, the aggregated data structure including, for each of the other web properties visited by any user in the sessions that included a visit to the web property of interest, a count of a number of visits to such other web property and next property information regarding which web property within the network was visited next during the session after visiting such other web property;
    receiving a query from a user identifying the web property of interest and one or more metrics related to the web property of interest, the metrics including a count of unique upstream properties consumed by the web property of interest or a count of unique downstream properties produced by the web property of interest, wherein an upstream property consumed is a web property visited prior to the web property of interest during a session, and wherein a downstream property produced is a web property visited subsequently to the web property of interest during a session;
    computing the one or more metrics regarding the web property of interest based upon the aggregated data structure; and
    presenting the one or more metrics to the user as a report.

2. The method of claim 1, wherein the aggregated data structure is an aggregated source and destination tree.

3. The method of claim 1, wherein the metrics include metrics regarding the count of unique upstream properties consumed.

4. The method of claim 3, wherein the metrics include a ratio of a number of upstream visits consumed divided by a number of upstream properties consumed, wherein an upstream visit consumed is a visit to a property prior to the web property of interest during a session.

5. The method of claim 1, wherein the metrics include metrics regarding the count of unique downstream properties produced.

6. The method of claim 5, wherein the metrics include a ratio of a number of downstream visits produced divided by number of downstream properties produced, wherein a downstream visit produced is a visit to a property subsequent to the web property of interest during a session.

7. The method of claim 1, wherein the metrics include a ratio of the number of downstream properties produced divided by the number of upstream properties consumed.

8. The method of claim 1, wherein the metrics include a ratio of the number of downstream visits produced divided by the number of upstream visits consumed.

9. The method of claim 1, further comprising:
    generating a report based on the one or more metrics, wherein the report shows the top properties in the network as ranked by properties' respective ratios of visits produced divided by visits consumed.

10. An apparatus for determining traffic patterns involving a web property of interest in a computer network, the apparatus comprising:
    an interface configured to receive a query from a user identifying the web property of interest and one or more metrics related to the web property of interest, the metrics including a count of unique upstream properties consumed by the web property of interest or a count of unique downstream properties produced by the web property of interest, wherein an upstream property consumed is a web property visited prior to the web property of interest during a session, and wherein a downstream property produced is a web property visited subsequently to the web property of interest during a session;
    a source-to-destination processing engine configured to receive path data regarding the web property of interest, wherein the path data comprises information regarding user sessions in the computer network, each user session including a plurality of web properties visited by a corresponding user each web property comprising one or more web pages, and being characterized by a distinct subject matter or service, and to, for a particular web property of interest, identity based on the path data all other web properties visited in any session that included a visit to the web property of interest, and, for each of the other web properties, generate count information by counting a number of visits by any user to each such other web property in the sessions that included a visit to the web property of interest;
    an aggregated data structure construction module coupled to the source-to-destination processing engine and configured to construct, using a processor, from the path data and the count information, an aggregated data structure corresponding to the web property of interest, the aggregated data structure including, for each of the other web properties visited by any user in the sessions that included a visit to the web property of interest, a count of a number of visits to such other web property and next property information regarding which web property within the network was visited next during the session after visiting such other web property; and
    a reporting module coupled to the aggregated data structure construction module and configured to, upon receiving the query from the user identifying the web property of interest and the one or more metrics related to the web property of interest, compute the one or more metrics regarding the web property of interest based upon the aggregated data structure; and
    present the one or more metrics to the user as a report.

11. The apparatus of claim 10, wherein the aggregated data structure is an aggregated source and destination tree.

12. The apparatus of claim 10, wherein the metrics include metrics regarding the count of unique upstream properties consumed.

13. The apparatus of claim 10, wherein the metrics include metrics regarding the count of unique downstream properties produced.

14. The apparatus of claim 10, wherein the reporting module is further configured to generate a report based on the one or more metrics, wherein the report shows the top properties in the network as ranked by properties' respective ratios of visits produced divided by visits consumed.

15. An apparatus for determining traffic patterns involving a web property of interest in a computer network, the apparatus comprising:

means for receiving a query from a user identifying the web property of interest and one or more metrics related to the web property of interest, the metrics including a count of unique upstream properties consumed by the web property of interest or a count of unique downstream properties produced by the web property of interest, wherein an upstream property consumed is a web property visited prior to the web property of interest during a session, and wherein a downstream property produced is a web property visited subsequently to the web property of interest during a session;

means for receiving path data regarding the web property of interest, wherein the path data comprises information regarding user sessions in the computer network, each user session including a plurality of web properties visited by a corresponding user, each web property comprising one or more web pages, and being characterized by a distinct subject matter or service;

means for, for a particular web property of interest, identifying based on the path data all other web properties visited in any session that included a visit to the web property of interest;

means for, for each of the other web properties, generating count information by counting a number of visits by any user to each such other web property in the sessions that included a visit to the web property of interest;

means for constructing, using a processor, from the path data and the count information, an aggregated data structure corresponding to the web property of interest, the aggregated data structure including, for each of the other web properties visited by any user in the sessions that included a visit to the web property of interest, a count of a number of visits to such other web property and next property information regarding which web property within the network was visited next during the session after visiting such other web property;

means for, upon receiving the query from the user identifying the web property of interest and the one or more metrics related to the web property of interest, compute the one or more metrics regarding the web property of interest based upon the aggregated data structure; and means for presenting the one or more metrics to the user as a report.

16. The apparatus of claim 15, wherein the aggregated data structure is an aggregated source and destination tree.

17. The apparatus of claim 15, wherein the metrics include metrics regarding the count of unique upstream properties consumed.

18. The apparatus of claim 15, wherein the metrics include metrics regarding the count of unique downstream properties produced.

19. The apparatus of claim 15, further comprising:

means for generating a report based on the one or more metrics, wherein the report shows the top properties in the network as ranked by properties' respective ratios of visits produced divided by visits consumed.

\* \* \* \* \*